United States Patent [19]
Iino

[11] Patent Number: 5,986,694
[45] Date of Patent: Nov. 16, 1999

[54] IMAGE PROCESSING APPARATUS FOR MOVING CAMERA

[75] Inventor: Mitsutoshi Iino, Hino, Japan

[73] Assignees: Fuji Electric Co., Ltd., Kawasaki; Fuku Facom Corp., Tokyo, both of Japan

[21] Appl. No.: 08/921,503

[22] Filed: Sep. 2, 1997

[30] Foreign Application Priority Data

Sep. 3, 1996 [JP] Japan .................................. 8-232898

[51] Int. Cl.$^6$ .................................................. H04N 17/00
[52] U.S. Cl. ...................... 348/135; 348/580; 382/285; 382/291; 382/154
[58] Field of Search .................................. 348/169, 135, 348/136, 137, 139–140, 141–142, 42–44, 46–48, 580, 581, 583; 382/154, 285, 291, 107, 276; 356/375; H04N 17/00

[56] References Cited

U.S. PATENT DOCUMENTS

| | | | |
|---|---|---|---|
| 5,473,931 | 12/1995 | Brady et al. ............................. | 348/169 |
| 5,647,018 | 7/1997 | Benjamin ................................ | 382/128 |
| 5,703,961 | 12/1997 | Rogina et al. .......................... | 382/154 |
| 5,748,199 | 5/1998 | Palm ....................................... | 345/473 |
| 5,764,786 | 6/1998 | Kuwahima et al. .................... | 382/107 |
| 5,920,395 | 7/1999 | Schulz .................................... | 356/375 |

FOREIGN PATENT DOCUMENTS

| | | | |
|---|---|---|---|
| 61-288139 | 12/1986 | Japan .............................. | G01N 15/14 |
| 2-6246 | 1/1990 | Japan .............................. | B60Q 3/02 |
| 5-334438 | 12/1993 | Japan .............................. | G06F 15/70 |
| 7-244519 | 9/1995 | Japan .......................... | G05B 19/4155 |

OTHER PUBLICATIONS

"Plant operation monitoring man/machine interface with using direct operation to Image" (written by M. Tani et al. Institute of Electorical Society D. vol. 111, no. 12, 1991 pp. 1023 to 1030).

*Primary Examiner*—Vu Le
*Attorney, Agent, or Firm*—Pearne, Gordon, McCoy & Granger LLP

[57] ABSTRACT

With employment of two images acquired by imaging an imaging object at two different positions and also parameters of a camera under imaging operation at these positions, both the imaging positions with respect to an origin, and also positions of the imaging object with respect to both the imaging positions are obtained as three-dimensional vectors. With employment of the calculated three-dimensional vector of the imaging position with respect to the origin and also the three-dimensional vector of the imaging object position with respect to the imaging position, the imaging object position with respect to the origin is mapped as the three-dimensional vector.

5 Claims, 5 Drawing Sheets

IMAGE PROCESSING APPARATUS FOR MOVING CAMERA

BACKGROUND OF THE INVENTION

1. Field of the Invention

The present invention relates to an image processing apparatus for mapping a position of an imaging object and also for identifying an object within a three-dimensional space from a camera image produced by imaging the imaging object by a television camera which moves while being connected to a computer.

2. Description of the Related Art

Conventionally, as the method for mapping positions of objects within camera images, the below-mentioned first, second, and third methods are known. The first and second methods are described in, for instance, the Japanese publication "PLANT OPERATION MONITORING MAN/MACHINE INTERFACE WITH USING DIRECT OPERATION TO IMAGE" (written by M. TANI et al, Institute of Electrical Society D, volume 111, No. 12, 1991, pages 1023 to 1030). The third method is disclosed in Japanese Laid-open Patent Application No.5-334438 opened in 1993 filed by the Applicant.

(1) The first method is such a mapping method that while the camera image display range is defined as the two-dimensional orthogonal coordinate space, the object position is given as the two-dimensional orthogonal coordinates. In this method, while the range represented in the camera image is defined as the two-dimensional orthogonal coordinates space, the object position is given as the coordinates within this two-dimensional orthogonal coordinate space. In other words, the projection of the three-dimensional coordinates of the object is defined by the two-dimensional coordinates within the camera image of the fixed camera.

(2) The second method is such a mapping method that while the camera image is set as the projection image of the three-dimensional space to the two-dimensional space, the object position and the camera position are given as the two-dimensional orthogonal coordinates. In this mapping method, the position of the camera and the actual position of the object are given by the coordinates within the three-dimensional orthogonal coordinate space. As a consequence, even when the camera parameter is changed, the projection calculation about the three-dimensional coordinates of the object position to the two-dimensional coordinates is executed, so that the coordinates of the object position on the projection plane can be obtained.

(3) The third mapping method is such a mapping method that the camera image is set as the projection image of the three-dimensional coordinate space to the two-dimensional space while setting the camera position as the origin, and the object position is given as the three-dimensional coordinates while setting the camera position as the original. In this mapping method, the object position is mapped into the three-dimensional space by way of the polar coordinates while setting the camera position as the original with employment of the coordinate of the summit of the camera image display range as the two-dimensional coordinate space, the object coordinate within the display range, and the camera parameter. Also, as the object identifying method, the cursor figure for instructing the object image within the camera image display range is set, and the position of this cursor figure is mapped by way of the above-described mapping method. Similarly, the point position instructed with the camera image display range is mapped by way of the above-described mapping method, and the position of the cursor figure is compared with the point position in the polar coordinates, so that the object related to the instructed point is identified.

However, the above-described conventional mapping methods suffers from the following problems:

(1) In accordance with the first mapping method, when the camera parameters such as the position, the elevation angle, the horizontal angle, and the field angle of the camera are changed, the coordinates of the object positions within the image display range are also changed. Then, when the object position is mapped, the respective camera images having the different camera parameters must be mapped.

(2) In accordance with the second mapping method, when the coordinates of the object position are set, the three-dimensional coordinate data must be entered. Also, the complex three-dimensional projection calculation must be carried out every time the camera parameter is changed.

(3) The third mapping method may be readily applied to such an imaging system that the camera parameters other than the camera position are changed. Moreover, the amount of the projection calculation is small and the data setting/inputting operation can be simply executed. However, this third mapping method could not be applied to such an imaging system with employment of the moving camera, namely the camera position is changed.

SUMMARY OF THE INVENTION

The present invention has been made to solve the above problems, and therefore an object of the present invention is to provide an image processing apparatus for a moving camera, which is capable of readily mapping the coordinates of the positions of the imaging object even in the imaging system in which the camera position is changed, readily measuring the normalized approximate dimension of the object, easily identifying the object at high speed from the image of the moving camera, and reducing the measurement errors.

To achieve the above object, according to a first aspect of the present invention, there is provided an image processing apparatus for a moving camera, in which an image produced by imaging an imaging object by a television camera movable in a three-dimensional space, and also a parameter constructed of coordinate values, an elevation angle, a horizontal angle, a field angle of the television camera under imaging operation are inputted to a computer apparatus, whereby a position of the imaging object is mapped in the three-dimensional space, while the television camera is moved to two different positions so as to image the imaging object, thereby acquiring two images, two imaging positions of the imaging object with respect to an origin of the three-dimensional space, and positions of the imaging object with respect to the two imaging positions are acquired as three-dimensional vectors by using the acquired two images and parameters of the television camera under imaging operation. Thereafter, the position of the imaging object with respect to the origin is displayed as the three-dimensional vector by employing the acquired three-dimensional vector of the imaging position with respect to the origin, and also the acquired three-dimensional vector of the position of the imaging object with respect to the imaging position. As a result, the imaging object position is mapped on the three-dimensional space.

Also, according to a second aspect of the present invention, in the image processing apparatus, a rectangle externally made in contact with the imaging object is set onto both of the images imaged at the two different positions, respectively. Next, a center point of both of the set rectangles is acquired to thereby calculate three-dimensional coordinate values of an object from the center point. Furthermore, a normalized approximate dimension of an object is calculated by employing dimensions of the both rectangles, and also distances measured from the camera position to the both rectangles. As a result, the imaging object is identified.

Further, according to a third aspect of the present invention, in the image processing apparatus, the three-dimensional vectors of the imaging object and the normalized approximate dimension of the object are recorded on a recording apparatus, when a retrieve instruction is issued by input means to retrieve the three-dimensional space coordinate position, the recording apparatus is retrieved to judge as to whether or not the object is recorded at the relevant three-dimensional space coordinate position, thereby outputting a retrieved result.

Still further, according to a fourth aspect of the present invention, in the image processing apparatus, while grouping a plurality of imaging objects and applying origins specific to the grouped imaging objects when a plurality of imaging objects are imaged, the origins are switched in response to the positions of the television camera to thereby process the image.

The above and other objects and features of the present invention will be more apparent from the following description taken in conjunction with the accompanying drawings.

DETAILED DESCRIPTION OF THE PREFERRED EMBODIMENTS

Now, a description will be given in more detail of preferred embodiments of the present invention with reference to the accompanying drawings.

First, an image processing apparatus for a moving camera according to a first aspect of the present invention will now be described. According to the first aspect of the present invention, an imaging object is imaged at two positions, as to display ranges of camera images entered from the respective camera positions, coordinates of positions of the imaging object are mapped as a three-dimensional vector based on calculated coordinate positions of the imaging object, and coordinates of the respective camera positions. To the contrary, in the conventional third method, the imaging object is imaged at one camera position.

Figure 1:
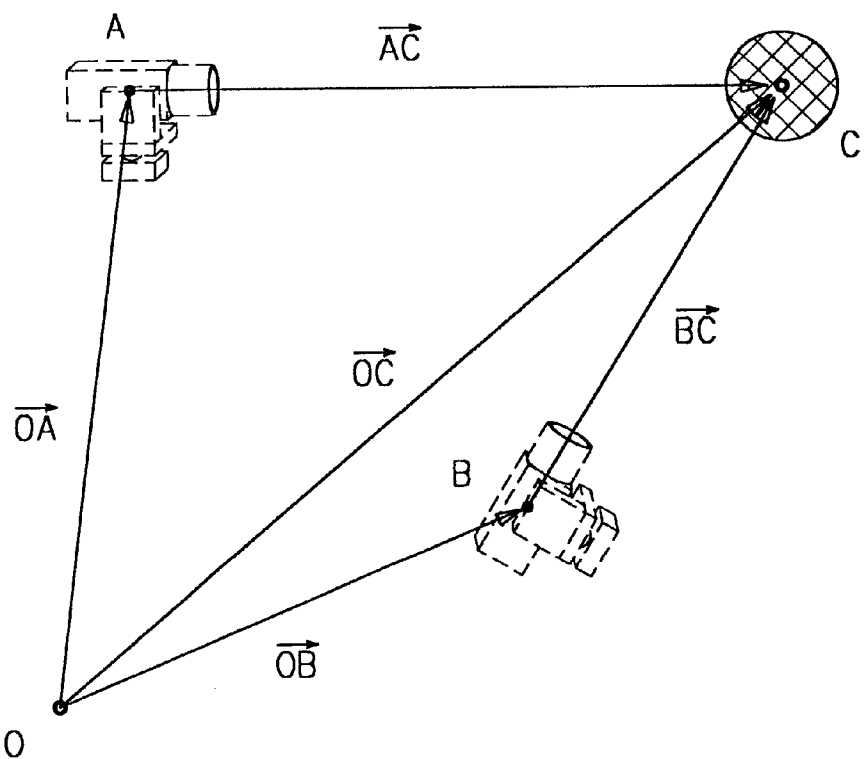
FIG. 1 is an explanatory diagram showing a camera and a positional relationship between an object position and an origin of a coordinate system according to the first aspect of the invention.

FIG. 1 is an explanatory diagram showing a television camera, and a positional relationship between an object position and an origin of a coordinate system according to the first aspect of the invention. In this drawing, points A and B show positions of the television camera, symbol C indicates object position coordinate, and symbol O represents a coordinate origin. Vectors OA and OB are three-dimensional vectors defined from the origin O to each of the camera position coordinates. Also, vectors AC and BC are three-dimensional vectors defined from each of the camera position coordinates to the object position coordinate C. A three-dimensional vector OC defined from the origin O to the object position coordinate C is calculated by employing these vectors.

In this case, the vectors AC and BC may be obtained in accordance with the conventional third method:

$$AC = (\gamma_{AC}, \theta_A, \phi_A)$$
$$BC = (\gamma_{BC}, \theta_B, \phi_B) \quad (1)$$

In this formula, symbol $\gamma_{AC}$ and $\gamma_{BC}$ are unknown. When the above-described formula is expressed by the three-dimensional orthogonal coordinate system, the following formula is given:

$$AC = \gamma_{AC}(X_{AC}, Y_{AC}, Z_{AC})$$
$$BC = \gamma_{BC}(X_{BC}, Y_{BC}, Z_{BC}) \quad (2)$$

Also, the positions A and B of the camera are known, and the vectors OA and OB are determined as the following formula:

$$OA = \gamma_{OA}(X_{OA}, Y_{OA}, Z_{OA})$$
$$OB = \gamma_{OB}(X_{OB}, Y_{OB}, Z_{OB}) \quad (3)$$

As a consequence, the vector OC is expressed by the following two formulae:

$$OC = OA + AC = \gamma_{OA}(X_{OA}, Y_{OA}, Z_{OA}) + \gamma_{AC}(X_{AC}, Y_{AC}, Z_{AC})$$
$$OC = OB + BC = \gamma_{OB}(X_{OB}, Y_{OB}, Z_{OB}) + \gamma_{BC}(X_{BC}, Y_{BC}, Z_{BC}) \quad (4)$$

As a consequence, the unknown numbers $\gamma_{AC}$ and $\gamma_{BC}$ may be calculated by solving the below-mentioned simultaneous equations:

$$\gamma_{OA}X_{OA} + \gamma_{AC}X_{AC} = \gamma_{OB}X_{OB} + \gamma_{BC}X_{BC}$$
$$\gamma_{OA}Y_{OA} + \gamma_{AC}Y_{AC} = \gamma_{OB}Y_{OB} + \gamma_{BC}Y_{BC}$$
$$\gamma_{OA}Z_{OA} + \gamma_{AC}Z_{AC} = \gamma_{OB}Z_{OB} + \gamma_{BC}Z_{BC}$$

As a result of the above-explained conditions, according to the first aspect of the present invention, the object position can be readily mapped to the third-dimensional space by employing a plurality of images acquired from the moving camera.

Next, an image processing apparatus for a moving camera according to a second aspect of the present invention will now be explained. That is, the image processing apparatus of the second aspect of the present invention is to identify an imaging object in the camera image display range of the first aspect of the invention as follows: Rectangles involving the imaging object are set, a center of these rectangles is set as an object position coordinate, and also a dimension of the rectangular is recorded. After a three-dimensional vector of the above-described imaging object position has been calculated, a distance between each of the camera position coordinates and the object position coordinate is calculated. An approximate dimension of the object is normalized by employing the dimension of each of the rectangles and the distance measured from the camera position, so that the imaging object is identified.

Figure 2:
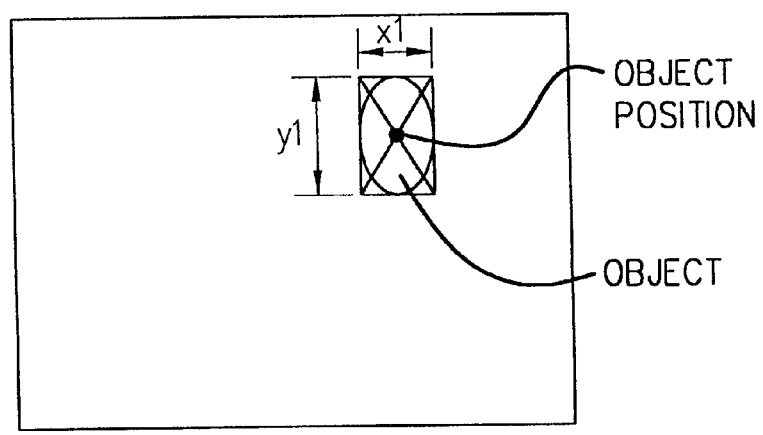
FIG. 2 is an explanatory diagram showing a camera image display range defined by a camera A in the above-described positional relationship shown in FIG. 1, according to a second aspect of the invention.

FIG. 2 shows a camera image display range defined by a camera A in the above-described positional relationship shown in FIG. 1. Similarly, FIG. 3 shows a camera image display range defined by a camera b in the above-described positional relationship shown in FIG. 1.

Figure 3:
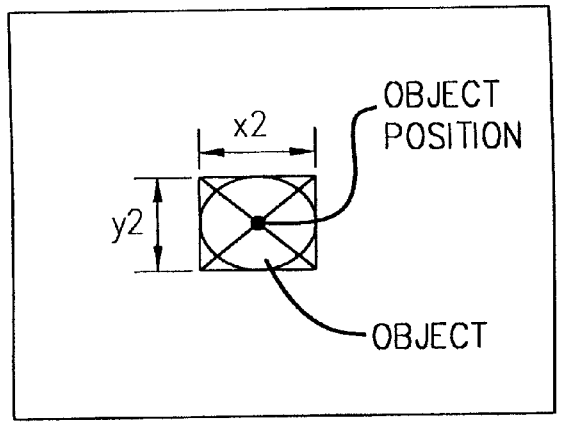
FIG. 3 is an explanatory diagram showing a camera image display range defined by a camera B in the above-described positional relationship shown in FIG. 1, according to the second aspect of the invention.

As represented in FIGS. 2 and 3, a rectangle involving the respective projection images of an object is set, and while a center point thereof is set as an object position, a three-dimensional vector of an object position is obtained by way of the above-explained mapping method according to the first aspect of the present invention. Furthermore, as dimensions of projection images of the object onto the two-dimensional plane, (x1, y1) and (x2, y2) are obtained respectively. This value is normalized by using the distances γAC and γBC defined from the camera positions A, B to the object, which are calculated according to the first aspect of the present invention to thereby acquire $(x1/\gamma_{AC}, y1/\gamma_{AC})$, $(x2/\gamma_{BC}, y2/\gamma_{BC})$. While the larger value is set as the approximate dimension (x, y) of the object, this larger value is recorded in combination with the three-dimensional vector of the object position.

It should be noted that even when the same object is imaged, since this object is projected along the different directions as well as from the different distances, this object is observed with the different object positions and the difference dimensions on the two-dimensional plane, which will cause errors. However, this error may be reduced by employing the apparatus according a fourth aspect of the present invention.

As previously described, according to the second aspect of the present invention, it is possible to easily measure the dimension of the normalized approximate value of the object.

Next, an image processing apparatus for a moving camera according to a third aspect of the present invention will now be described. The apparatus according to the third aspect of the present invention is to retrieve an object in such a manner that the object is selected with a moving camera image display range, and the object is retrieved by employing the three-dimensional vector of the object recorded according to the second aspect of the present invention, and the normalized approximate dimension of the object.

Figure 4:
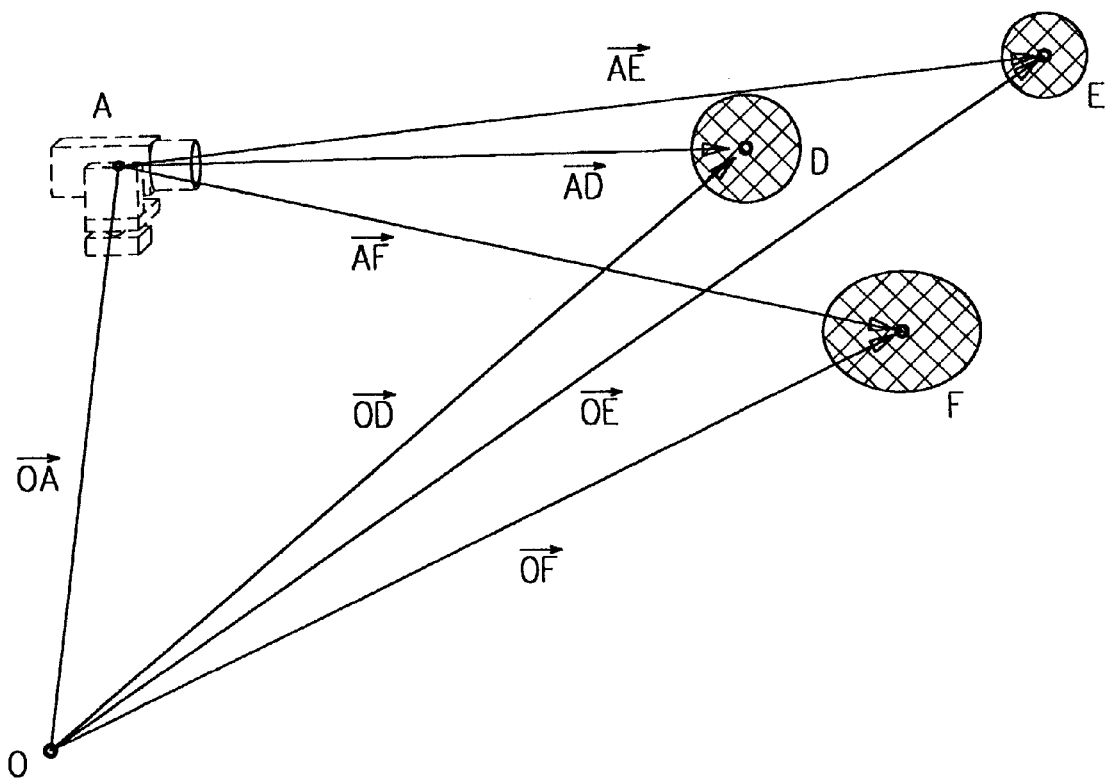
FIG. 4 is an explanatory diagram showing a camera and a positional relationship between a camera and objects in a coordinate system according to a third embodiment of the present invention.

In a positional relationship between a camera and objects shown in FIG. 4, three-dimensional vectors AE, AD, AF from a camera position a to the respective objects D, E, F may be easily calculated based upon the three-dimensional vectors OD, OE, OF of the respective object positions, and the three-dimensional vector OA of the camera position, which have been already recorded in accordance with the following equations:

$$AD = OD - OA$$

$$AE = OE - OA$$

$$AF = OF - OA \qquad (6)$$

Figure 5:
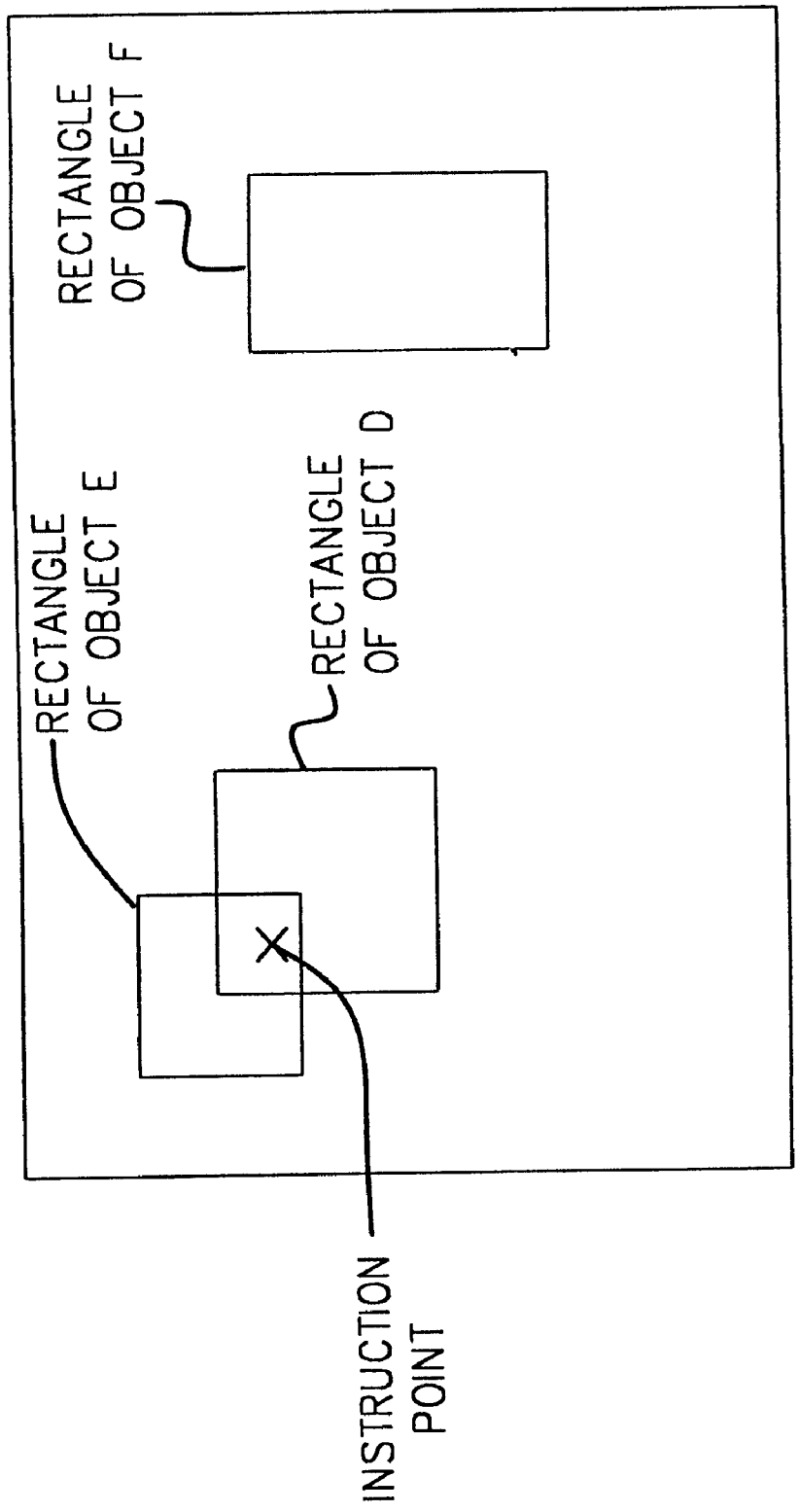
FIG. 5 is an explanatory diagram showing a method of obtaining a projection of a rectangle indicative of a dimension of an object onto the camera image display range according to the third embodiment of the present invention.

As a result, projections of object points onto the camera image display range at the camera position A may be obtained by employing the conventional third method. As indicated in FIG. 5, based upon the normalized approximate dimensions of the respective objects previously recorded, and also the distances |AD|, |AE|, |AF| from the camera position to the respective objects, a projection of a rectangle indicative of a dimension of an object onto the camera image display range can be obtained. When an instruction point shown in this drawing is designated, it can be seen from the projections of the rectangles of the respective objects that the instruction point is involved in the object E or D. In this case, since the distances to the object E and the object D are known, such an object with a shorter distance from the camera is employed as a retrieve result.

With the above description, according to the third aspect of the present invention, the object can be easily and quickly identified from the image of the moving camera.

Then, a description will now be given of a fourth aspect of the present invention. An image processing apparatus for a moving camera according to the fourth aspect of the present invention is to execute a process calculation as follows. A plurality of imaging objects are grouped, and one coordinate origin is applied to the grouped objects. While the object is retrieved, a plurality of coordinate origins are switched by the positions of the moving camera so as to perform the process calculation. In an actual application system, for instance, there are high necessities that an object arranged on a wall surface is imaged so as to be mapped. The larger the errors occurred in the respective embodiments of the present invention are increased, the larger the distances between the camera and the respective objects become. The larger the adverse influences are increased, the larger the measurement direction of the object differs. As a consequence, as shown in FIG. 6, a plurality of coordinate origins mapped in response to the position of the camera are set, so that the measurement errors can be reduced.

Figure 6:
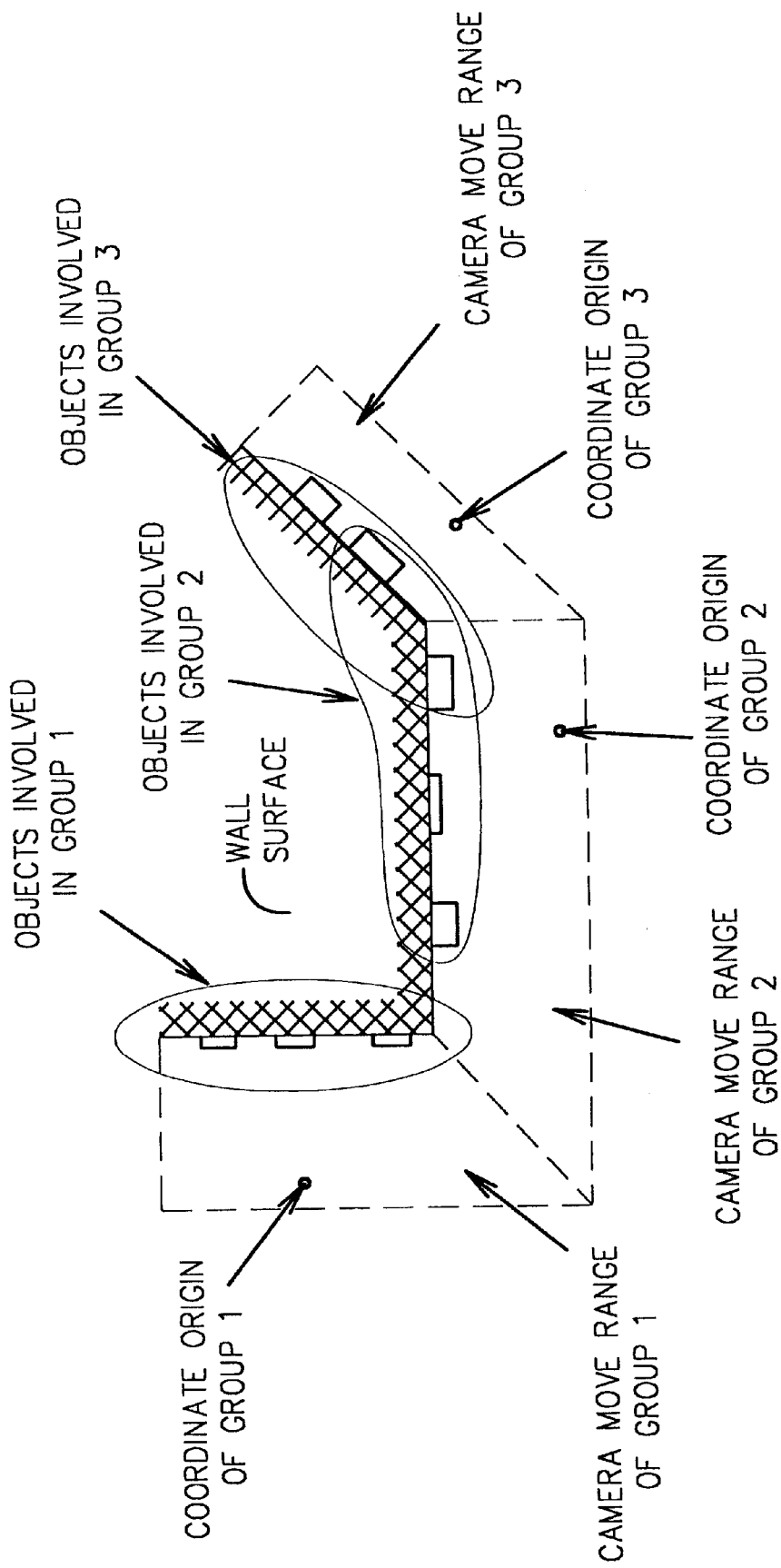
FIG. 6 is an explanatory diagram showing objects subdivided into three groups according to a fourth embodiment of the present invention.

In FIG. 6, objects are subdivided into three groups, and a coordinate origin and a camera moving range are set to each of these three groups. Both three-dimensional vectors of the respective objects from the coordinate origins, and the normalized approximate dimensions are measured and recorded. As to the objects involved in the plural groups, the three-dimensional vectors from the respective coordinate origins, and the normalized approximate dimensions are measured and recorded. As a consequence, in such a case that the object is retrieved from the camera image display range, a selection is made of such a group having the camera moving range involving this camera position, and then the object is identified by using the mapping method related to the third aspect of the present invention.

As a consequence, according to the fourth aspect of the present invention, the measurement errors can be reduced.

Figure 7:
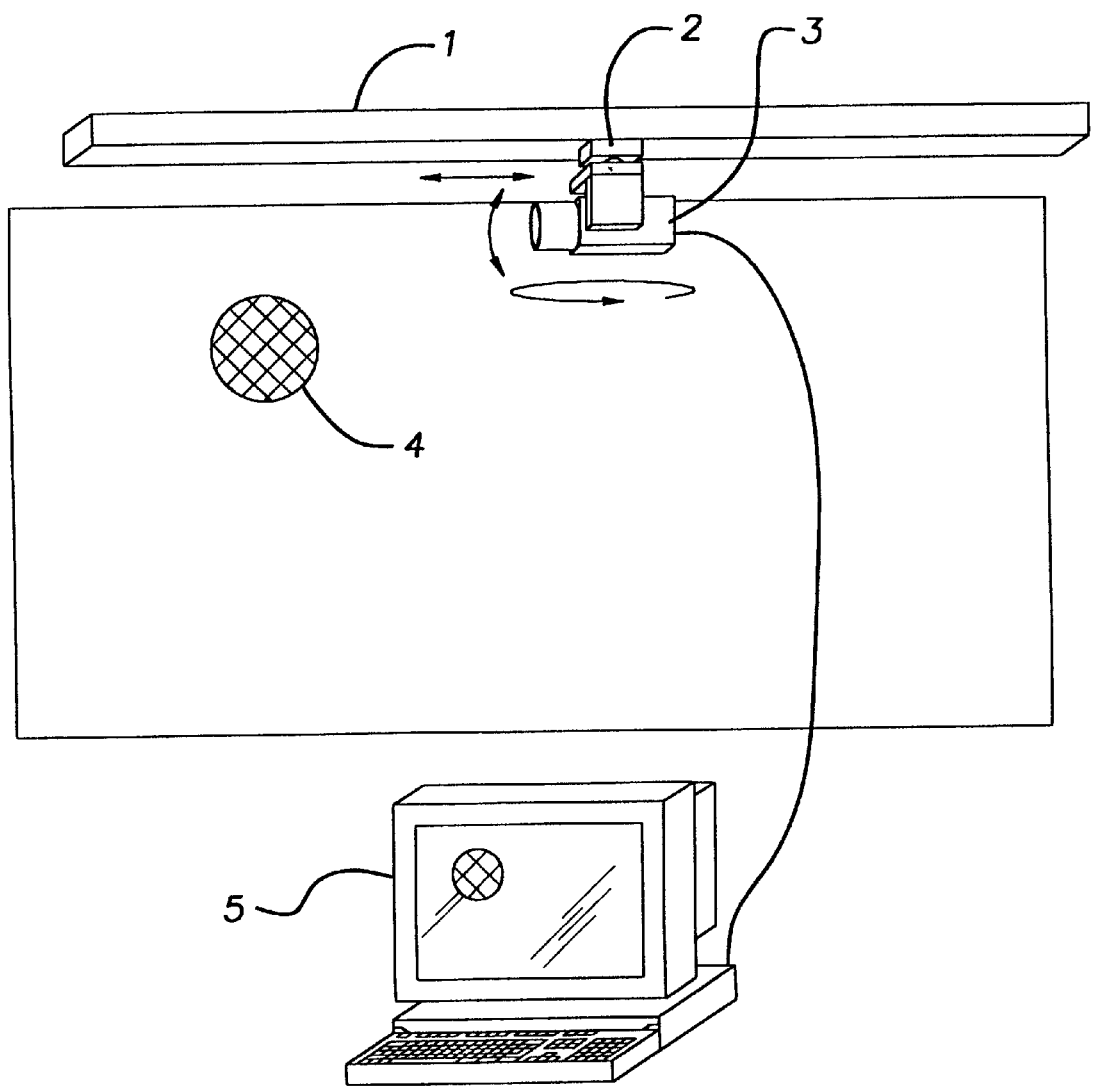
FIG. 7 shows a structural example of a practical apparatus to which the respective embodiments of the present invention are applied.

FIG. 7 illustrates a structural example of a practical apparatus to which the respective embodiments of the present invention may be applied. In this drawing, a television camera 3 equipped with a zooming function is mounted on a universal head 2 in such a manner that this television camera 3 can be rotated, and tilted along upper/lower directions. The universal head 2 is moved while being loaded on a rail 1 installed on a ceiling. An imaging object 4 is imaged by the television camera 3 to acquire an image thereof, and this image information is inputted to a computer 5. The camera parameters (camera position, elevation angle, horizontal angle, surface angle) may be varied by controlling the universal head 2 and the zooming magnification of the television camera 3 under control of the computer 5. Each of the varied parameters is entered into the computer 5.

Next, operations of the practical apparatus will now be described. First, at a first position (not shown), an image entered into the computer 5 is displayed within a camera image display range. Then, a three-dimensional polar coordinate value of an object position with respect to the camera position, and a rectangle externally made in contact with the object are measured. Next, the camera position is moved by traveling the universal head 2 so as to image the object at a second position (not shown) where a three-dimensional polar coordinate value of this object position with respect to the camera position, and also a rectangle externally made in contact with the object are similarly measured. Furthermore, a three-dimensional vector of the object measured from an origin of this polar coordinate system, and also an approximate value of the object are calculated by way of the first and second aspects of the present invention. Then, the calculation results are saved in the computer 5.

Subsequently, in order to identify the object from the camera image, an image of the object imaged at a third position (not shown) is inputted into the computer 5, and this image is displayed within the camera image display range. Under such a condition, when an operator points out the object image under display by using a pointing device, a calculation is made by using the mapping method according to the third aspect of the present invention as to three-dimensional vectors of the respective objects with respect to the saved camera positions, and also projections of rectangles involving the imaging object onto the camera image display range. Then, the object is identified at high speed by comparing these calculation results with the pointing position. Also, when the rail is bent, the respective rails are subdivided into a plurality of blocks. With respect to each of these subdivided blocks, a three-dimensional block of the object position from the coordinate origin of the relevant block is measured, and a normalized approximate dimension of the object is measured. The measurement results with respect to each of these subdivided blocks are recorded by the computer 5. When the object is identified, the relevant block is selected from the position on the rail of the camera, and then the above-described identification calculation is carried out.

As was previously described, in accordance with the first aspect of the present invention, the imaging object is imaged at two positions, as to the display ranges of the camera images entered from the respective camera positions, the coordinates of the positions of the imaging object can be mapped as the three-dimensional vector based on the calculated coordinate positions of the imaging object, and the coordinates of the respective camera positions. Thus, the coordinates of the positions of the imaging object can be readily mapped even in the imaging system in which the camera position is changed.

Also, in accordance with the second aspect of the present invention, it is possible to identify the imaging object in the camera image display range of the first aspect of the invention as follows: The rectangles involving the imaging object are set, the center of these rectangles is set as the object position coordinate, and also the dimension of the rectangular is recorded. After the three-dimensional vector of the above-described imaging object position has been calculated, the distance between each of the camera position coordinates and the object position coordinate is calculated. The approximate dimension of the object is normalized by employing the dimension of each of the rectangles and the distance measured from the camera position, so that the imaging object can be identified. Thus, the normalized approximate dimension of the object can be readily measured.

Furthermore, in accordance with the third aspect of the present invention, it is possible to retrieve the object in such a manner that the object is selected with the moving camera image display range, and the object is retrieved by employing the three-dimensional vector of the object recorded in accordance with the second aspect of the present invention, and the normalized approximate dimension of the object. Accordingly, the object can be easily identified in high speed from the image of the moving camera.

Still further, in accordance with the fourth aspect of the present invention, it is possible to execute the process calculation as follows. A plurality of imaging objects are grouped, and one coordinate origin is applied to the grouped objects. While the object is retrieved, a plurality of coordinate origins are switched by the positions of the moving camera so as to perform the process calculation. As a result, the measurement errors can be reduced.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image processing apparatus for a moving television camera, in which an image is produced by imaging a stationary imaging object by the television camera, said television camera being movable in a three-dimensional space, and wherein a parameter constructed of coordinate values, an elevation angle, a horizontal angle, a field angle of the television camera under imaging operation are inputted to a computer apparatus, whereby a position of the imaging object is mapped in the three-dimensional space, said apparatus comprising:

means for acquiring as three-dimensional vectors, while the television camera is moved to two different positions so as to image the imaging object, thereby acquiring two images, two imaging positions of said imaging object with respect to an origin of the three-dimensional space, and positions of said imaging object with respect to said two imaging positions, by using said two acquired images and parameters of said television camera under imaging operation; and means for displaying the position of the imaging object with respect to the origin as the three-dimensional vector by employing said acquired three-dimensional vector of the imaging positions with respect to the origin, and also said acquired three-dimensional vector of the position of said imaging object with respect to the imaging positions.

2. An image processing apparatus as claimed in claim 1, further comprising:

means for switching, while grouping a plurality of imaging objects and applying origins specific to the grouped imaging objects when a plurality of imaging objects are imaged, said origins in response to the positions of the television camera.

3. An image processing apparatus for a moving television camera, in which an image is produced by imaging an imaging object by the television camera movable in a three-dimensional space, and wherein a parameter constructed of coordinate values, an elevation angle, a horizontal angle, a field angle of the television camera under imaging operation are inputted to a computer apparatus, whereby a position of the imaging object is mapped in the three-dimensional space, said apparatus comprising:

means for acquiring as three-dimensional vectors, while the television camera is moved to two different positions so as to image the imaging object, thereby acquiring two images, two imaging positions of said imaging object with respect to an origin of the three-dimensional space, and positions of said imaging object with respect to said two imaging positions, by using said two acquired images and parameters of said television camera under imaging operation;

means for displaying the position of the imaging object with respect to the origin as the three-dimensional vector by employing said acquired three-dimensional vector of the imaging positions with respect to the origin, and also said acquired three-dimensional vector of the position of said imaging object with respect to the imaging position;

means for setting a rectangle externally made in contact with the imaging object onto both of said images imaged at the two different positions;

means for acquiring a center point of both of said set rectangles to thereby calculate three-dimensional coordinate values of an object from said center point; and means for calculating a normalized approximate dimension of an object by employing dimensions of said both rectangles, and distances measured from the camera position to said both rectangles.

4. An image processing apparatus as claimed in claim 3, further comprising:

a recording apparatus for recording the three-dimensional vectors of said imaging object and the normalized approximate dimension of the object; and retrieving means, when a retrieve instruction is issued by input means to retrieve the three-dimensional space coordinate position, for retrieving said recording apparatus to judge as to whether or not the object is recorded at the relevant three-dimensional space coordinate position, thereby outputting a retrieved result.

5. An image processing apparatus as claimed in claim 3 or 4, further comprising:

means for switching, while grouping a plurality of imaging objects and applying origins specific to the grouped imaging objects when a plurality of imaging objects are imaged, said origins in response to the positions of the television camera.

* * * * *